United States Patent Office 2,767,624
Patented Oct. 23, 1956

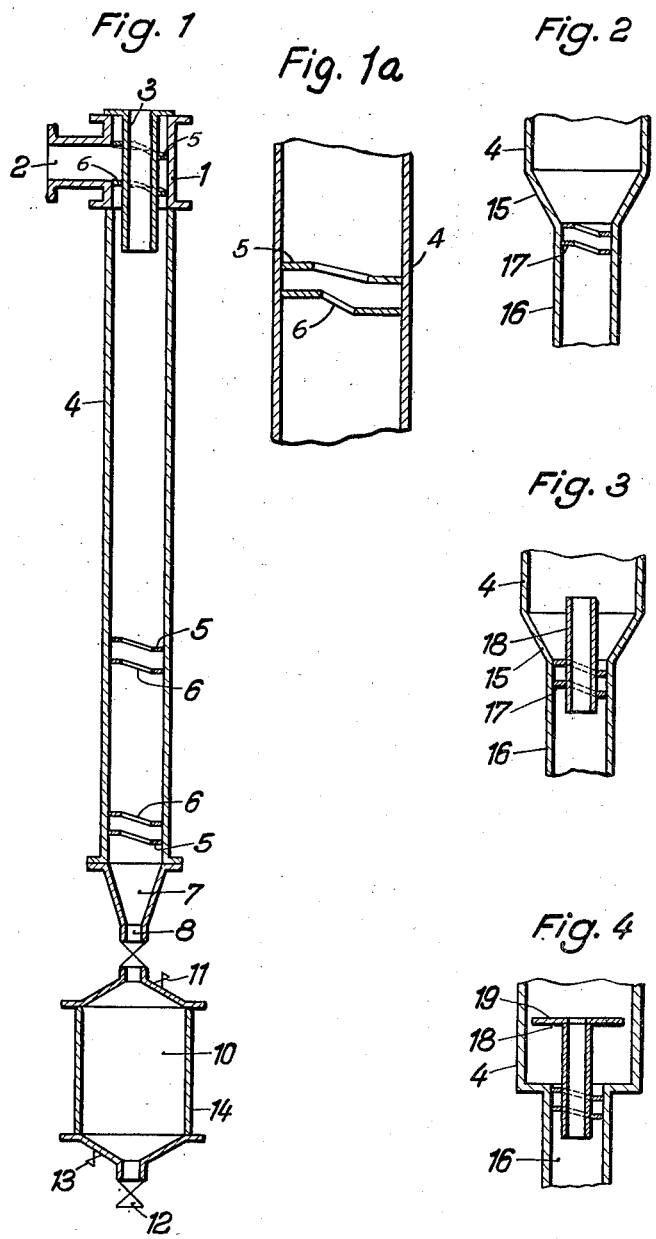

2,767,624

TUBULAR HYDROEXTRACTOR FOR THE PURIFYING OF SUSPENSIONS, ESPECIALLY SUSPENSIONS CONTAINING FIBROUS MATERIAL

Robert Hoesch, Duren, Rhineland, Germany, assignor to O. Dorries A. G. vorm. Maschinenfabrik Banning & Seybold, Duren, Rhineland, Germany, a firm Application July 6, 1951, Serial No. 235,517

Claims priority, application Germany July 29, 1950

8 Claims. (Cl. 92—28)

The present invention relates to tubular hydroextractors for the purifying of suspensions of the type in which the unpurified material is fed into the upper end of the extractor through a tangentially disposed inlet nozzle in such a manner that it flows helically downward along the inner surface of the tube, so that impurities accumulate on the extreme periphery of the helical stream of the fluid and can be removed therefrom, whilst the purified material flows upwardly along a helical stream of a smaller diameter inside the stream of the unpurified material to a co-axially placed outlet. Tubular hydroextractors of this type are especially suited for purifying suspensions containing fibrous material, e. g. in the manufacture of paper.

A known device of this kind comprises a smooth surfaced tube, at one end of which are arranged the inlet and outlet for the suspension, and the other end of which is formed as a hollow cone. Experiments have shown that the pitch of the helical line of flow of the liquid introduced at the upper end of the tube increases towards the lower end of the tube, whereby the purifying efficiency is diminished.

It is an object of the present invention to provide an improved tubular hydroextractor.

The hydroextractor for purifying suspensions according to the present invention is characterized in that there is provided in the extractor tube below the tube head at least one helical guide within the range of the downward vortex, and having a central aperture for the upward vortex, the said guide being contiguous with the inside surface of the tube and its pitch being not greater than the pitch of the incoming vortex at the tube head. The pitch of the liquid helix is thus reduced to its initial value or below the same.

Since as a rule it would be too difficult in practice to provide the tube along its whole extent with a suitable guide, it is sufficient to provide the tube at one or more points with one or several short sections of the guide; experimetns have shown that in many cases it is sufficient to provide a single turn of the helical guide.

In cases where a helical guide comprising several turns is required, it is advantageous to give the central aperture for the upward flow a larger diameter in the upper turns of the guide than in the lower turns. In this case the diameters of the apertures will as a rule decrease in the downward direction continuously and uniformly. The result achieved by thus shaping the helical guide is that the purified portion of the suspension is forced to turn its direction of flow upward not all at once but in several stages. If the extractor tube is provided with several helical guides, it is preferable for the same reason that the diameter of the central aperture of each guide should be less than that of the guide above it.

In order to increase the purification effect, the extractor tube can be narrowed, continuously or by stages. In the latter case the helical guide can be conveniently mounted at the upper end of the narrowed part, whilst if the constriction be conical, it can be mounted directly in the same.

In order to achieve a better separation of the purified suspension, which flows upward through the central aperture of the helical guide, from the unpurified suspension, which flows downward between the surfaces of the guide, the central aperture of the guide can be screened by a riser pipe which is carried by the helical guide. If the helical guide is placed in a constricted part of the extractor tube or underneath the same, it is advantageous to extend the riser pipe upwards beyond the constricted portion. In order to deflect a considerable part of the purified suspension towards the outlet and away from the inlet, a baffle ring can be mounted at the upper end of the riser pipe, the external diameter of which is smaller than the internal diameter of the extractor tube, its internal diameter being equal to the diameter of the riser pipe. The purified suspension is deflected upward along this ring, whilst the outwardly circulating unpurified suspension can flow downward through the slit between the ring and the inner surface of the tube.

The present invention will be more fully understood from the following description with reference to the accompanying drawing of one embodiment and various modifications thereof. This embodiment is given by way of example.

In the drawing:

Figure 1 shows a longitudinal section of a tubular hydroextractor in accordance with the invention; Figure 1a shows the pitch of the inlet and Figures 2, 3 and 4 show fragmentary longitudinal sections of various modifications of the extractor.

Referring to Figure 1, the tubular hydroextractor comprises an extractor tube 4 provided with a tube head 1 having tangential inlets 2, which may be cast integrally with the head, for the unpurified suspension, and a co-axial outlet tube 3. The lower end of the outlet tube 3 extends downward some distance below the orifice of the inlet 2. The extractor tube 4 is disposed co-axial with the tube head 1.

The extractor tube 4 is provided toward its lower end with two helical guides 5 each having two turns. Each guide is provided with a central aperture 6. A funnel 7 is fitted on to the extractor tube 4 in which funnel the purified suspension is deflected towards the openings 6 whilst the specifically heavier impurities flow down through the outlet 8 and a check valve 9 into a tank 10.

The tank 10 has an air vent cock 11 in its lid, a check valve 12 for the purpose of the periodical removal of the accumulated impurities in its bottom, and a water valve 13. The cylindrical jacket 14 of the tank 10 is made preferably of transparent material such as synthetic resin.

Figure 2 shows a longitudinal section of part of an extractor tube 4 which is narrowed at one point. The upper, broader part is connected with the lower, narrower part 16 by a funnel-shaped connection 15. The helical guide 17 is mounted immediately underneath the connection 15, but it can be disposed equally well inside the latter.

Figure 3 shows a longitudinal section of a similarly narrowed extractor tube comprising an upper part 4, a funnel-shaped connection 15, a narrower tube 16 and a helical guide 17; a riser pipe 18 is inserted in the central aperture of the guide 17 and extends beyond the upper rim of the connection 15. The riser pipe also extends some distance into the narrower part 16.

Figure 4 illustrates a sudden step-like connection between the broader tube 4 into the narrower tube 16; the riser pipe 18 is furthermore provided with a baffle ring 19.

I claim:

1. A tubular hydroextractor for the purifying of liquid suspensions, comprising a vertical substantially cylindrical extractor tube, a tube head at the top thereof having a tangential inlet for the suspension, and an axial outlet for the purified suspension, an outlet in the bottom for the impurities, and at least one unbroken helical guide of at least one complete turn provided with a central aperture for the upward vortex, said guide being contiguous with the inside surface of said tube and being disposed below the tube head and inlet and being inside said extractor tube within the range of the downward vortex, and having a pitch less than the pitch of the incoming vortex in said tube head, a substantial portion of said tube extending below said guides, whereby the original pitch of said suspension is restored just below said guides, a central substantially cylindrical portion of said tube being free from obstructions to permit free upward flow of purified suspension.

2. A tubular hydroextractor for the purifying of liquid suspensions, comprising a vertical substantially cylindrical extractor tube, a tube head at the top thereof having a tangential inlet for the suspension and an axial outlet for the purified suspension, and outlet in the bottom for the impurities, and at least one unbroken helical guide of at least one complete turn provided with a central aperture for the upward vortex, said guide being contiguous with the inside surface of said tube and being disposed below said tube head and inlet and being inside said extractor tube within the range of the downward vortex, and having a pitch less than the pitch of the incoming vortex in said tube head, the width of the helical guide increasing in the downward direction, a substantial portion of said tube extending below said guides, whereby the original pitch of said suspension is restored just below said guides, a central substantially cylindrical portion of said tube being free from obstructions to permit free upward flow of purified suspension.

3. A tubular hydroextractor for the purifying of liquid suspensions, comprising a vertical substantially cylindrical extractor tube, a tube head at the top thereof having a tangential inlet for the unpurified suspension and an outlet in the bottom for the impurities, several unbroken helical guides of at least one complete turn provided with a central aperture for the upward vortex, said guides being contiguous with the inward surface of said tube, the pitch of said helical guides being less than the pitch of the incoming vortex in said tube head, said helical guides being disposed one above the other, and the central aperture of a lower guide having a smaller diameter than that of an upper guide, a substantial portion of said tube extending below said guides, whereby the original pitch of said suspension is restored just below said guides, a central substantially cylindrical portion of said tube being free from obstructions to permit free upward flow of purified suspension.

4. A tubular hydroextractor for the purifying of liquid suspensions, comprising a vertical substantially cylindrical extractor tube, a tube head at the top thereof having a tangential inlet for the suspension and an axial outlet for the purified suspension, an outlet in the bottom for the impurities, at least one unbroken helical guide of at least one complete turn provided with a central aperture for the upward vortex, said guide being contiguous with the inner surface of said tube and disposed within the range of the downward vortex, the pitch of said helical guide being not greater than the pitch of the incoming vortex in said tube head, and said helical guide or guides being disposed adjacent the narrowing of said tube, a substantial portion of said tube extending below said guides, whereby the original pitch of said suspension is restored just below said guides, a central substantially cylindrical portion of said tube being free from obstructions to permit free upward flow of purified suspension.

5. A tubular hydroextractor for the purifying of liquid suspensions, comprising a vertical substantially cylindrical extractor tube, a tube head at the top thereof having a tangential inlet for the suspension and an axial outlet for the purified suspension, and an outlet in the bottom for the impurities, at least one unbroken helical guide of at least one complete turn provided with a central aperture for the upward vortex, said guide being contiguous with the inner surface of said tube and disposed below said tube head and inside said extractor tube within the range of the downward vortex, the pitch of said helical guide being less than the pitch of the incoming vortex in said tube head, and further comprising a co-axial riser pipe which is disposed in the central aperture of said helical guide or guides, a substantial portion of said tube extending below said guides, whereby the original pitch of said suspension is restored just below said guides, a central substantially cylindrical portion of said tube being free from obstructions to permit free upward flow of purified suspension.

6. A tubular hydroextractor for the purifying of liquid suspensions, comprising a vertical substantially cylindrical extractor tube, a tube head at the top thereof having a tangential inlet for the suspension and an axial outlet for the purified suspension, an outlet in the bottom for the impurities, at least one unbroken helical guide of at least one complete turn provided with a central aperture for the upward vortex said guide being contiguous with the inner surface of said tube and being disposed within the range of the downward vortex below said tube head and inlet and being inside said extractor tube, the pitch of said helical guide being less than the pitch of the incoming vortex in said tube head, and further comprising a co-axial riser pipe disposed in the central aperture of said helical guide or guides, and a baffle ring mounted on said riser pipe, the outer diameter of said ring being smaller than the inner diameter of said extractor tube and the inner diameter of said ring being equal to the diameter of said riser pipe, a substantial portion of said tube extending below said guides, whereby the original pitch of said suspension is restored just below said guides, a central substantially cylindrical portion of said tube being free from obstructions to permit free upward flow of purified suspension.

7. A tubular hydroextractor for the purifying of liquid suspensions, comprising a vertical substantially cylindrical extractor tube, a tube head at the top thereof having a tangential inlet for the suspension, and an outlet in the bottom for the impurities, at least one unbroken helical guide of at least one complete turn having a central aperture for the upward vortex, said guide being contiguous with the inner surface of said tube and disposed below said tube head and inlet and being inside said extractor tube within the range of the downward vortex, the pitch of said helical guide being less than the pitch of the incoming vortex in the tube head, said extractor tube narrowing in the downward direction in stages, and further comprising a helical guide which is mounted in a narrowing portion and immediately underneath the same, and a co-axial riser pipe surrounded by the last mentioned guide, a substantial portion of said tube extending below said guides, whereby the original pitch of said suspension is restored just below said guides, a central substantially cylindrical portion of said tube being free from obstructions to permit free upward flow of purified suspension.

8. A tubular hydroextractor for the purifying of liquid suspensions, comprising a vertical substantially cylindrical extractor tube, a tube head at the top thereof having a tangential inlet for the suspension and an axial outlet for the purified suspension, and an outlet in the bottom for the impurities, at least one unbroken helical guide of at least one complete turn contiguous with the inner surface of said tube and disposed below said tube head and inside extractor tube within the range of the downward vortex, said guide having a central aperture for the upward vortex, the pitch of said helical guide being less than the pitch of the incoming vortex in said tube head, said extractor tube narrowing in the downward direction in stages, and further comprising a helical guide which is mounted in a narrowing portion and immediately underneath the same, a co-axial riser pipe surrounded by the last mentioned guide, and a baffle ring mounted on said riser pipe, the outer diameter of said ring being smaller than the inner diameter of said extractor tube and the inner diameter of said ring being equal to the diameter of said riser pipe, a substantial portion of said tube extending below said guides, whereby the original pitch of said suspension is restored just below said guides, a central substantially cylindrical portion of said tube being free from obstructions to permit free upward flow of purified suspension.

References Cited in the file of this patent

UNITED STATES PATENTS

| Number | Name | Date |
|---|---|---|
| 762,867 | Allen | June 21, 1904 |
| 1,701,942 | Andrews | Feb. 12, 1929 |
| 1,880,185 | Kerns et al. | Sept. 27, 1932 |
| 2,102,525 | Freeman | Dec. 14, 1937 |
| 2,222,930 | Arnold | Nov. 26, 1940 |
| 2,346,005 | Bryson | Apr. 4, 1944 |
| 2,364,799 | Laughlin et al. | Dec. 12, 1944 |
| 2,512,253 | Lipscomb | June 20, 1950 |
| 2,542,635 | Davis | Feb. 20, 1951 |
| 2,543,689 | Driessen et al. | Feb. 27, 1951 |

FOREIGN PATENTS

| Number | Country | Date |
|---|---|---|
| 9,345 | Great Britain | of 1912 |